3,676,155
DEXTROSE ICINGS
Harold Edwin Horn, Oak Lawn, and Bruce Allan Kimball and Martin Michael Godzicki, Chicago, Ill., assignors to CPC International Inc.
No Drawing. Filed May 22, 1970, Ser. No. 39,903
Int. Cl. A23g 3/00
U.S. Cl. 99—139   2 Claims

ABSTRACT OF THE DISCLOSURE
Icings having improved skin forming and texture properties containing dextrose ad dextrose hydrate.

---

This invention relates to icings and iced bakery products. More specifically, it relates to the use of dextrose as a sweetening agent in icings and iced bakery products.

The sweetening agent most often used in the formation of icings for bakery products is sucrose. Icings made with sucrose are, however, not ideal in that they are often not smooth enough, exhibit excessive grittiness and are often overly sweet.

A specific problem which occurs when sucrose is used as the sweetening agent in icings is that the sucrose icings generally take some time to form a hard surface layer or skin. This is especially detrimental when the bakery products on which these icings are placed are to be wrapped with cellophane, waxed paper or similar materials. Since the iced bakery products must be allowed to sit until the skin is formed before they can be wrapped, the baker must maintain large storage racks or the like.

The use of a sweetening agent in icings which provides less sweetness and less grittiness than sucrose and which provides icings that are smoother and form a skin more quickly than sucrose icings, is therefore highly desirable. Such a sweetening agent would be even more attractive if it were relatively inexpensive.

In view of the above, it becomes an object of this invention to provide icings containing a sweetening agent which is less sweet and less gritty than sucrose.

A still further object of the invention is to provide icings which are smoother than sucrose icings.

A further object of the invention is to provide an icing which will for a skin faster than will an icing using sucrose alone as a sweetening agent.

A further object yet of the invention is to provide a bakery product coated with the above icing.

The above objects and advantages are realized in the present invention by preparing icings having as an essential ingredient a specific amount of powdered dextrose. Preferably this powdered dextrose is of a particle size which will pass through an 80 mesh sieve.

Icings made in the manner revealed in this invention are characterized in that they will be less sweet, less gritty, and smoother textured than icings made using sucrose as a sweetening agent.

Furthermore, superior icings suitable for immediate wrappings may be made by the methods of this invention. This type of icing is commonly known as a wrapped icing and will be hereinafter referred to as such. Wrapped icings are generally made by blending together a mixture of sucrose, water, salt, a levulose-dextrose mixture (invert), a shortening, a flavor material and a color material. A typical wrapped icing contains from about 40% to about 45% granulated sucrose, 40% to 50% powdered sucrose, 3% to 4% water, salt, 3% to 4% invert, 3% to 4% flavors and coloring material, 1% to 2% shortening, 1% to 2% oil, and .05% to .2% vanilla.

We have now found that a superior wrapped icing formulation comprises from about 5% to about 20% granulated sucrose, 20% to 45% crystalline dextrose hydrate, 40% to 50% powdered dextrose, up to about 5% water and from about 2% to about 5% shortening. In addition to these essential ingredients, typical additives, such as salt, oil, flavoring, color and the like, can be added in small proportions, such as from 0.01 to about 5%. This icing is superior in that it will form a skin very quickly thus allowing bakery products which are coated with the icing to be wrapped very soon after the coating is completed.

The relative amounts of sucrose and dextrose used in making a wrapped icing has been, surprisingly, found to be quite critical. Superior wrapped icings are only formed when the proportions of granular sucrose to crystalline dextrose hydrate set forth above are met.

When the above defined critical ranges of substituents are used, superior wrapped icings are formed which exhibit very fast skin formation. This fast skin formation is in sharp contrast to the unsatisfactorily slow skin formation obtained when the proportions of crystalline dextrose hydrate to granular sucrose falls outside of the critical range.

Another type of improved icing which can be prepared in accordance with the present invention is a butter cream icing. Butter cream icings generally comprise from about 70% to about 90% powdered sucrose, about 10% to about 15% shortening, and up to 15% of additives such as coloring and flavoring agents, humectants, extenders and the like.

We have found that superior butter cream icings can be formulated when powdered dextrose is used in place of powdered sucrose. The remainder of the formulation remaining essentially the same. Additional additives may, of course, be added to the icing. Butter cream icings made utilizing powdered dextrose in place of powdered sucrose are less sweet, less gritty and smoother textured than the corresponding sucrose icings.

Thus, a butter cream icing of the present invention comprises from about 70% to about 90% powdered dextrose and from about 10% to about 15% shortening. The shortenings which can be used in this icing are those usually used in the confectionery industry, such as hydrogenated vegetable oils, butter and the like. Butter cream icings preferably contain additional additives, such as humectants, flavoring agents, coloring agents, salt, water, vegetable oil and the like. Typical humectants are corn syrup, sorbitol and mannitol.

Another type of icing which can be prepared in accordance with the present invention is a flat icing. Flat icing generally comprise sucrose and a gelling agent. A typical flat icing is made by blending together a mixture of 50% to 60% granulated sucrose, 1% to 2% humectants, 7% to 12% water, .2% to .5% gelling agent, and 30% to 40% powdered sucrose.

We have found that a superior flat icing formulation can be made by replacing the granulated sucrose with crystalline dextrose hydrate and the powdered sucrose with powdered dextrose. Thus, a flat icing of the present invention comprises from about 50% to about 60% crystalline dextrose hydrate, from about 30% to about 40% powdered dextrose, from about 5% to about 12% water, and from about 0.1% to about 1% gelling agent. Optionally humectants, such as corn syrup, mannitol and sorbitol in an amount of from about 0.5% to about 2%, can be added. In addition, the usual additives, such as flavoring and coloring agents and preservatives can be added.

Bakery products, such as cakes, coffee cakes, cupcakes, donuts, pastries, and the like, may be coated with the above described icing formulations to produce iced bakery products. Flat icings are most useful on pastries and coffee cake. Wrapped icings are most useful on bakery products which are to be wrapped. Butter cream icings, which are extremely rich, are especially useful on cakes.

The following examples will illustrate the practice of this invention. These examples are meant to be illustrative and the invention, of course, is not to be limited thereto. All percentage figures are in weight percent unless otherwise specifically stated.

EXAMPLE I

Wrapped icings

A series of eight (8) wrapped icings were formulated using varying amounts of sucrose and dextrose. All of the icing formulations had the same amount of salt, invert, bitter chocolate, shortening, coconut oil, and vanilla. The icings were rated by a four (4) person test panel as to the acceptability of their gloss, texture, speed of skin formation, spreadability and shelf-life. The results of this testing are summarized in Table 1.

TABLE 1.—WRAPPED ICING FORMULATIONS

| | Sugar composition, weight percent | | | | | | | |
|---|---|---|---|---|---|---|---|---|
| | 1 | 2 | 3 | 4 | 5 | 6 | 7 | 8 |
| Ingredient: | | | | | | | | |
| Granulated sucrose | 50 | 50 | 42.5 | 25 | 12.5 | 7.5 | 2.5 | 0 |
| Crystalline dextrose hydrate | 0 | 0 | 7.5 | 25 | 37.5 | 42.5 | 47.5 | 50 |
| Powdered sucrose | 50 | 0 | 0 | 0 | 0 | 0 | 0 | 0 |
| Powdered dextrose | 0 | 50 | 50 | 50 | 50 | 50 | 50 | 50 |
| | Composition, ratings* | | | | | | | |
| Attributes: | | | | | | | | |
| Gloss | 1 | 1 | 1 | 1 | 1 | 1 | 4 | 2 |
| Texture (smoothness) | 2 | 1 | 1 | 1 | 1 | 1 | 4 | 2 |
| Skin formation | 1 | 3 | 4 | 4 | 2 | 1 | 4 | 2 |
| Spreadability | 1 | 1 | 1 | 1 | 1 | 1 | 4 | 2 |
| Shelf-life | 1 | 2 | 4 | 4 | 2 | 1 | 4 | 3 |

*1=Excellent; 2=Good; 3=Fair; 4=Poor.

The data indicate that for acceptable wrapped icing formulations there is a critical range of substitution of crystalline dextrose hydrate for granular sucrose.

EXAMPLE II

Butter cream icings

A butter cream icing was formulated containing 81.7% powdered sucrose, 4.75% water, 0.6% corn syrup, 0.3% salt and 12.65% shortening. A second butter cream icing was also formulated wherein the powdered sucrose was replaced with powdered dextrose. A four person panel rated both butter cream icings as to texture, spreadability and shelf-life. The icings were rated excellent in all these characteristics.

A fifteen person panel rated five butter cream icings, each made using a different sweetening agent in the following order: powdered dextrose, powdered sucrose, 4X powdered sucrose, 6X powdered sucrose and 10X powdered sucrose as to relative graininess. The test panelists were not informed as to which sweeting agent was utilized in the butter cream icings that they rated. The results of this testing are summarized in Table 2.

TABLE 2.—RANKING BY PREFERENCE BUTTER CREAM ICINGS USING DEXTROSE AND SUCROSE

| | Rank * | | | | | | |
|---|---|---|---|---|---|---|---|
| | 1 | 2 | 3 | 4 | 5 | 6 | 7 |
| Products: | | | | | | | |
| Powdered dextrose (99% thru 80 mesh) | 6 | 9 | 0 | 0 | 0 | 0 | 0 |
| Powdered sucrose | 0 | 0 | 0 | 3 | 1 | 1 | 10 |
| 4X sucrose | 0 | 0 | 2 | 4 | 2 | 3 | 4 |
| 6X sucrose | 0 | 1 | 3 | 0 | 7 | 4 | 0 |
| 10X sucrose | 0 | 0 | 1 | 3 | 3 | 5 | 3 |

*1=Least graininess; 7=Most graininess.

The data in Table 2 were subjected to a statistical analysis whereby the statistical significance level of the preference for powdered dextrose was evaluated. A statistical significance level of 99% would indicate that in a larger sampling, 99 out of 100 people would prefer the preferred icing. The results of the statistical analysis are presented in Table 3.

TABLE 3.— STATISTICAL SIGNIFICANCE OF PANEL RATINGS: POWDERED DEXTROSE (99% THROUGH 80 MESH) v. SICROSE GRADES

| Dextrose grade | Sucrose grade | Preferred | Statistical significance level, percent |
|---|---|---|---|
| 99% thru 80 mesh | Powdered | Dextrose | 99 |
| Do | 4X | do | 99 |
| Do | 6X | do | 99 |
| Do | 10X | do | 99 |

The data clearly indicate that powdered dextrose which will pass through an 80 mesh sieve, forms much less grainy butter cream icings than do any of the common grades of powdered sucrose.

EXAMPLE III

Flat icings

A series of four flat icings were formulated with dextrose progressively replacing sucrose in the formulations. The flat icings were formulated by (1) blending together about 40% of the granulated sugar or crystalline dextrose hydrate, corn syrup, and water, (2) mixing this blend with dissolved gelatin, (3) blending in a portion of the powdered sucrose or powdered dextrose and (4) then blending in the remainder of the powdered or granulated sucrose or crystalline dextrose hydrate. The resulting icings were then evaluated as to gloss, texture, skin, spreadability and shelf-life. The sugar composition and the results of the testing are listed in Table 4.

TABLE 4

| | Sugar composition, weight percent | | | |
|---|---|---|---|---|
| Ingredient: | | | | |
| Granulated sucrose | 50 | 50 | 7.5 | |
| Crystalline dextrose hydrate | | | 42.5 | 50 |
| Powdered sucrose | 50 | | | |
| Powdered dextrose | | 50 | 50 | 50 |
| | Compositions, ratings* | | | |
| Attributes: | | | | |
| Gloss | 1 | 1 | 1 | 1 |
| Texture | 1 | 1 | 1 | 1 |
| Skin | 1 | 4 | 4 | 1 |
| Spreadability | 1 | 2 | 3 | 1 |
| Shelf-life | 1 | 4 | 4 | 1 |

*1=Excellent; 2=Good; 3=Fair; 4=Poor.

The data clearly indicate that a high quality flat icing may be formulated when powdered and crystalline dextrose hydrate are substituted for powdered and granulated sucrose in the icing.

The formation of dextrose based icings which are equal or superior to sucrose based icings has been amply demonstrated by the preceding examples.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

The invention is hereby claimed as follows:

We claim:

1. An icing, which is suitable for wrapped goods, and which is characterized by rapid skin formation, comprising from about 5% to about 20% granulated sucrose, 20% to 45% crystalline dextrose hydrate, 40% to 50% powdered dextrose, up to about 5% water, and from about 2% to about 5% shortening.

2. The icing formulation of claim 1, which also contains from about 0.01% to about 5% of salt, oil, flavoring, and coloring material.

References Cited

UNITED STATES PATENTS

| | | | |
|---|---|---|---|
| 1,939,990 | 12/1933 | Krno et al. | 99—134 G |
| 2,129,859 | 9/1938 | Miner | 99—134 G |

FOREIGN PATENTS

| | | | |
|---|---|---|---|
| 493,005 | 9/1938 | Great Britain | 99—134 |

RAYMOND N. JONES, Primary Examiner

J. M. HUNTER, Assistant Examiner